Nov. 19, 1946.   W. A. BRECHT   2,411,363
LOCOMOTIVE DRIVE
Filed Aug. 26, 1943   4 Sheets-Sheet 1

INVENTOR
Winston A. Brecht.
BY
G. M. Crawford
ATTORNEY

Nov. 19, 1946.    W. A. BRECHT    2,411,363
LOCOMOTIVE DRIVE
Filed Aug. 26, 1943    4 Sheets-Sheet 3

WITNESSES:
E.A. McCloskey
H.S. Chilcott

INVENTOR
Winston A. Brecht
BY
R.M. Crawford
ATTORNEY

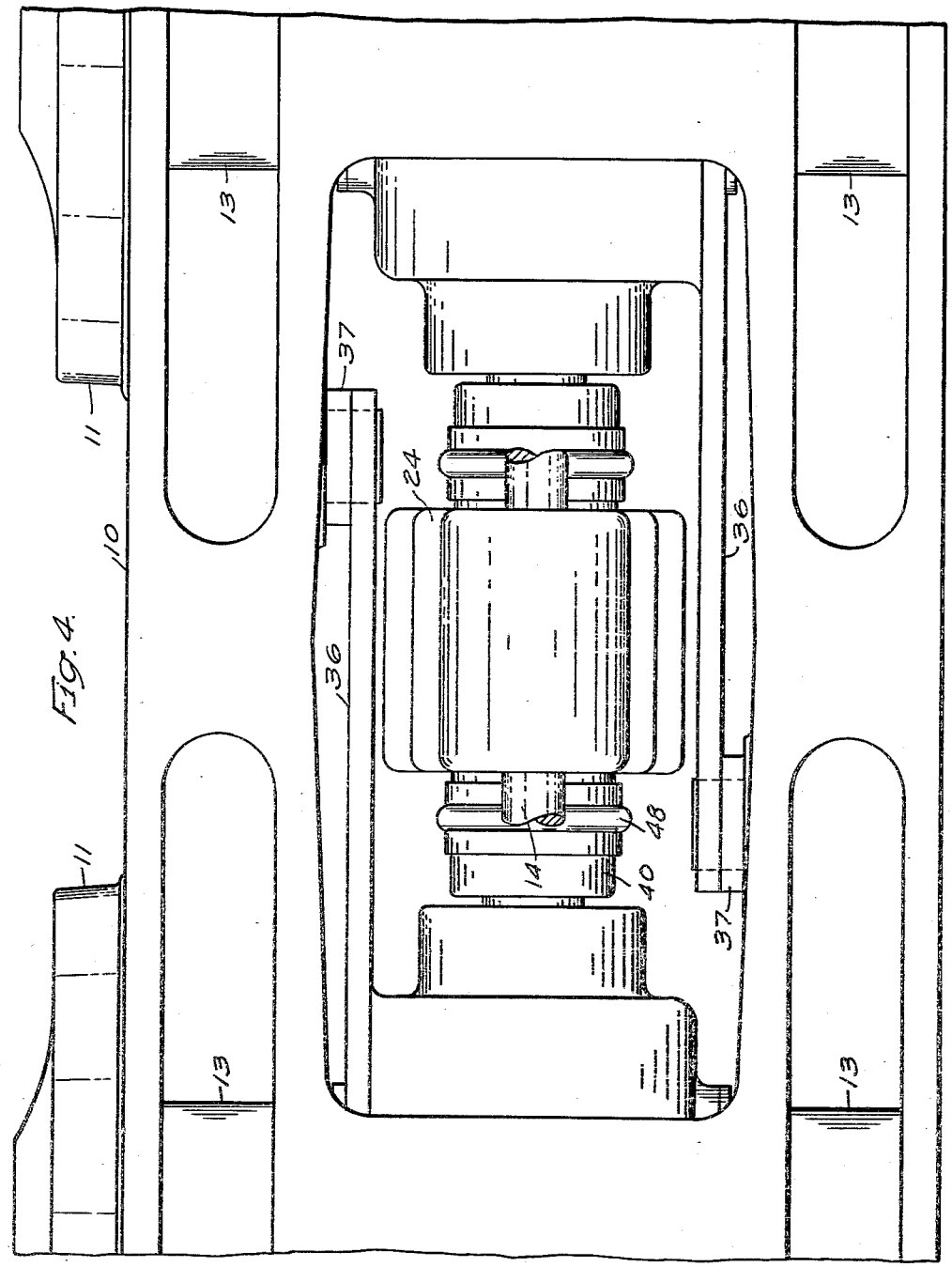

Patented Nov. 19, 1946

2,411,363

UNITED STATES PATENT OFFICE 2,411,363

LOCOMOTIVE DRIVE

Winston A. Brecht, Forest Hills, Pa., assignor to Westinghouse Electric Corporation, East Pittsburgh, Pa., a corporation of Pennsylvania Application August 26, 1943, Serial No. 500,096

5 Claims. (Cl. 105—117)

1

My invention relates, generally, to locomotive drives and, more particularly, to drives for steam turbine locomotives. However, it is not limited to that application and may be utilized with any prime mover where it is desirable to drive one or more axles from a single prime mover.

Heretofore, in locomotive drives it has been thought necessary to utilize quills, one of which surrounds each driving axle, and to transmit torque from the quills to the driving wheels by means of flexible drives. With a drive of the foregoing type it might be necessary to connect the wheels of adjacent axles by means of side rods to enforce a division of the power flow to each axle when the wheel diameters are not exactly equal.

An object of my invention, generally stated, is to provide a locomotive drive which shall be simple and efficient in operation and which may be economically manufactured and installed.

A more specific object of my invention is to provide a locomotive drive which shall ensure an equal division of load between the driving wheels.

Another object of my invention is to permit angular misalignments between the axes of certain of the shafts of a gear drive.

A further object of my invention is to permit both vertical and lateral movement of a gear driven axle relative to the driving unit.

Still another object of my invention is to provide a locomotive drive which can be utilized in a locomotive having its main frame mounted inside the wheels.

A still further object of my invention is to provide a locomotive drive suitable for a locomotive having one or more driving axles.

Other objects of my invention will be explained fully hereinafter or will be apparent to those skilled in the art.

In accordance with one embodiment of my invention, a bevel gear is disposed on each one of a pair of adjacent axles. The bevel gears are driven by pinions on shafts movably connected to an intermediate gear unit disposed between the axles. The intermediate gear unit is connected to the prime mover such as a steam turbine, by a shaft extending longitudinally of the locomotive.

For a fuller understanding of the nature and objects of my invention, reference may be had to the following detailed description, taken in conjunction with the accompanying drawings, in which Figure 1 is a view, partially in section and

2 partially in elevation, of a locomotive drive embodying my invention;

Fig. 4 is a view, in plan, of the structure shown in Fig. 3.

Figure 2:
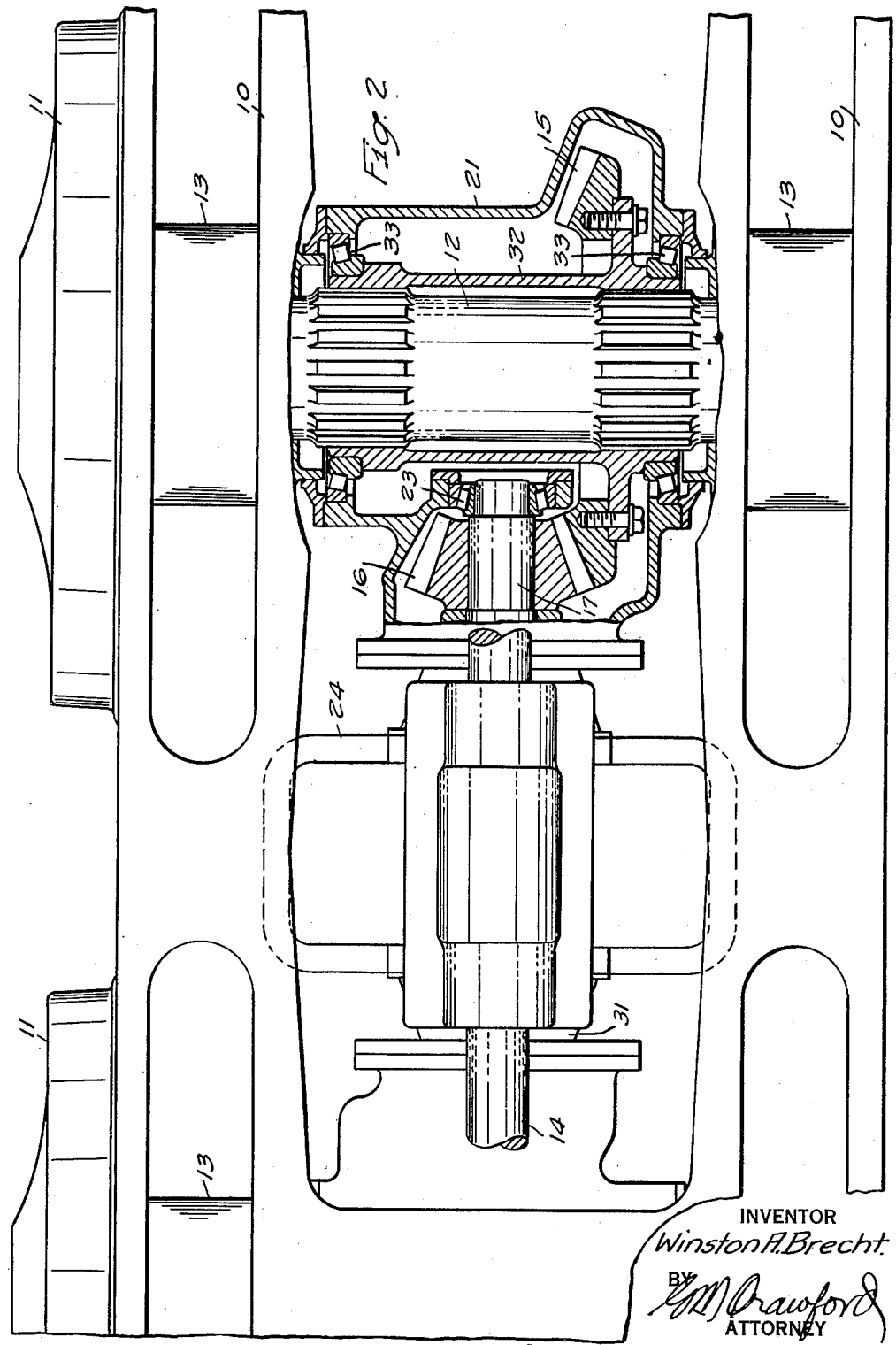
Fig. 2 is a view, partially in plan and partially in section, of the structure shown in Fig. 1.

Referring to the drawings, and particularly to Fig. 2, the portion of a locomotive structure shown therein comprises a pair of side frame members 10 which are disposed inside of the flanges of driving wheels 11 mounted on a pair of adjacent axles 12. The frame members 10 may be mounted on the axles 12 by means of journal bearings 13 of the usual type.

Figure 1:
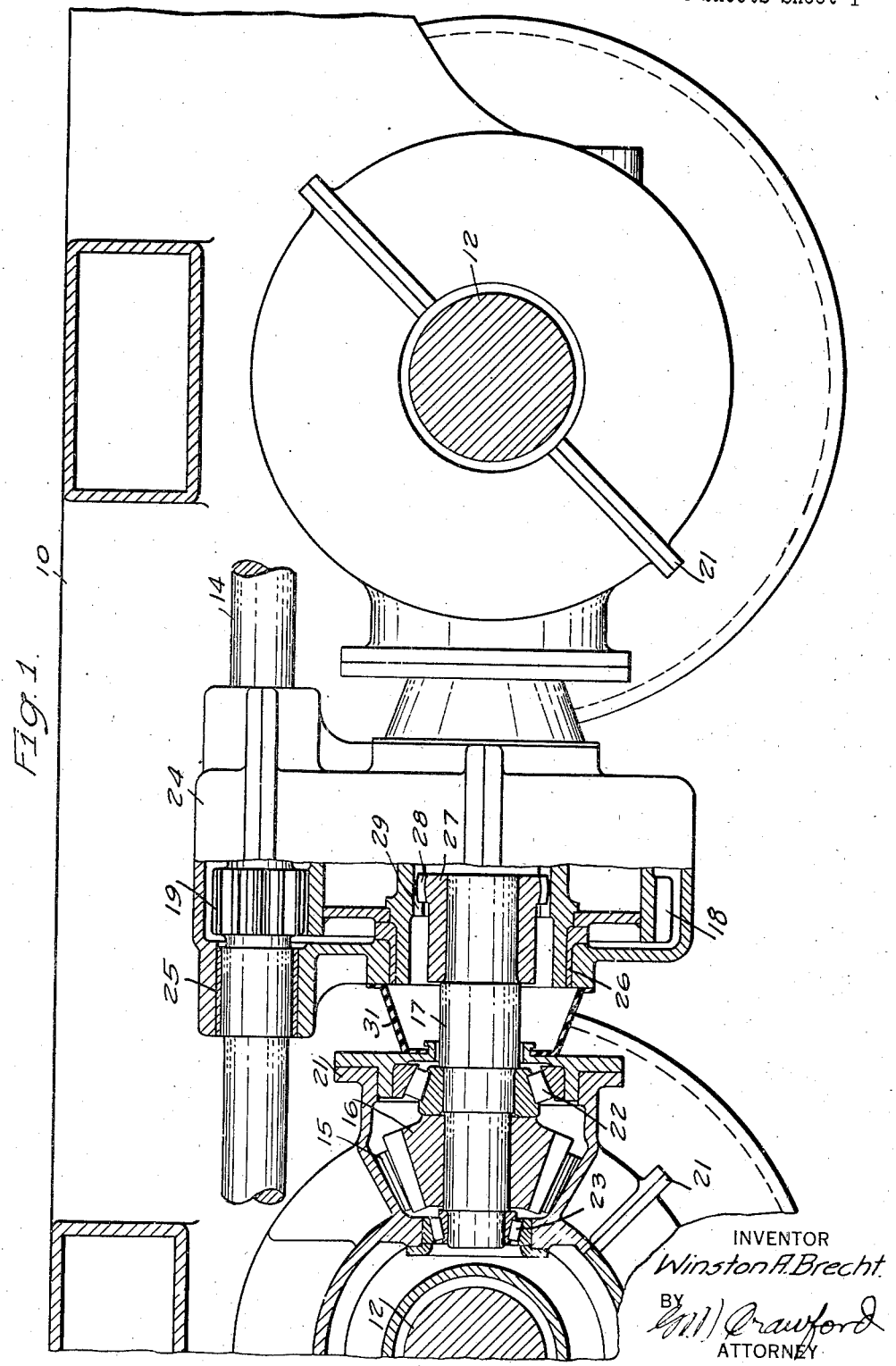

As shown in Fig. 1, the adjacent axles 12 may be driven by a main drive shaft 14 which extends longitudinally of the locomotive and may be connected to a steam turbine or other suitable prime mover in any suitable manner such as that disclosed in the copending application of W. A. Brecht and F. L. Alben, Serial No. 500,097, filed August 26, 1943, which has since matured into U. S. Patent No. 2,394,037, granted February 5, 1946.

In order to transmit torque from the main drive shaft 14 to the axles 12, a bevel gear 15 is mounted on each axle and is driven by a pinion 16 which is secured to an auxiliary drive shaft 17 disposed substantially parallel to the main drive shaft 14. The auxiliary drive shafts 17 are both movably connected to an intermediate gear 18 which is driven by pinions 19 secured to the main drive shaft 14. A split gear case 21 surrounds the bevel gear 15 upon each axle and contains roller bearings 22 and 23 for supporting the auxiliary shaft 17, thereby maintaining the pinion 16 in accurate alignment with its bevel gear 15 at all times.

The intermediate gear 18 and the pinions 19 are supported by a gear case 24 which may be split along the planes through the centers of the axles 12 and the drive shaft 14. The gear case 24 may be mounted in the locomotive frame in the manner disclosed in the aforesaid copending application. Suitable bearings 25 which may be of the sleeve type, are provided in the gear case 24 for the main drive shaft 14. Likewise, sleeve bearings 26 may be provided in the gear case 24 for the intermediate gear 18.

In order to permit angular misalignments between the axis of the intermediate gear 18 and the axes of the shafts 17, each shaft 17 extends inwardly almost to the center line between the axles 12 and carries a pinion 27 that is provided with teeth 28 which mesh with an internal gear 29 having the same pitch diameter and number of teeth as the pinion 27. As shown, the internal gear 29 is disposed inside of the intermediate gear 18.

In this manner the pinions 27 and the internal gear 29 constitute couplings for transmitting torque from the intermediate gear 18 to both of the shafts 17, and thence to the axles 12 through the pinions 16 and the bevel gears 15. The teeth 28 may be cut spherically, thereby permitting the necessary misalignments between the shafts 17 and the intermediate gear 18 to permit the vertical movements of the wheels usually encountered in the operation of railway locomotives. A flexible covering 31 may be provided for the space between the gear cases 24 and 21.

In order to simplify the drawings, a detailed view of the drive for only one axle has been shown. It will be understood that the drive for the other axle is a duplicate of the structure illustrated in detail.

It will be seen that the extension of each shaft 17 from the gear case 21 to the pinion 27 serves as a torque arm for the axle-mounted bevel gear unit and permits relative motions of this gear unit, together with the whole driving wheel and axle assembly, with respect to the intermediate gear unit contained in the gear case 24. As explained hereinbefore, the gear case 24 may be bolted to the locomotive frame which is, in turn, carried on the axle journals through the locomotive spring system. By unbolting the split gear case 24, both wheel and axle assemblies, together with the intermediate gear 18, may be removed from the locomotive.

In order to permit lateral movement of the axles 12 relative to the gear units, each axle 12 may be splined, as shown in Fig. 2, and the bevel gear 15 mounted on a sleeve 32 that is internally splined to match the axle 12. The gear case 21 is carried by roller bearings 33 which are mounted on the sleeve 32. In this manner, the gear unit may be constrained to move laterally with the side frames 10 and the relative motion between the gear unit and the axle is taken by sliding on the splines.

Figure 3:
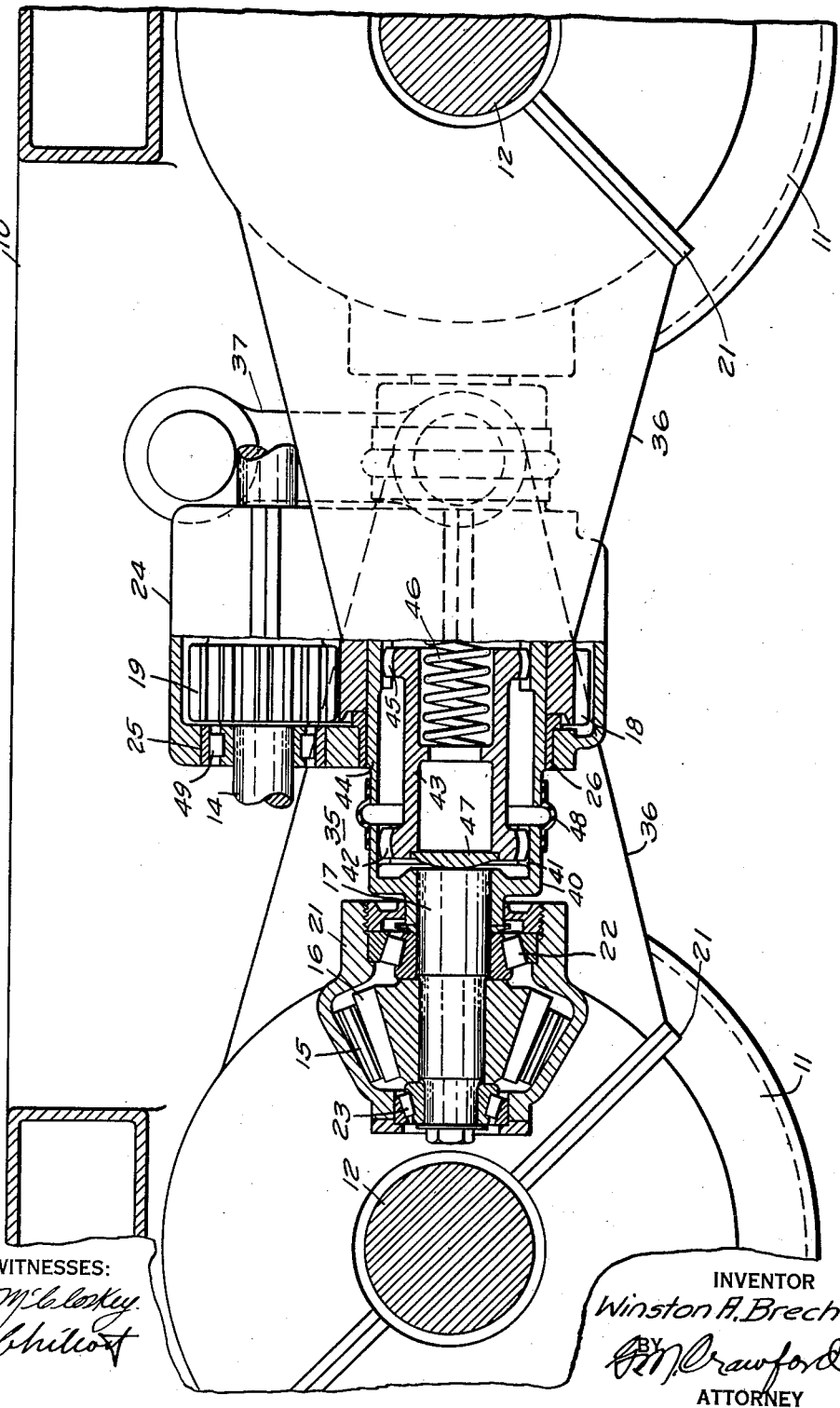
Fig. 3 is a view, partially in section and partially in elevation, of a modification of the invention.

In the modification of the invention shown in Figs. 3 and 4, a variation of the coupling structure is utilized to provide more complete freedom of relative motion between the axle gear unit and the intermediate gear unit. In the structure shown in Figs. 3 and 4, each one of the auxiliary shafts 17 is connected to the intermediate gear 18 by means of a double-coupling unit 35 instead of the single-coupling units hereinbefore described.

Each gear case 21 is also provided with an extension 36 which is a torque arm for the axle gear unit. Each torque arm 36 may be movably connected to the locomotive frame by means of a link 37. In this manner a greater degree of lateral freedom of motion for the axle assembly with respect to the intermediate gear unit is permitted by the present structure than by the single-coupling arrangement illustrated in Figs. 1 and 2. In addition, this greater freedom of movement permits the elimination of splines on the locomotive axles 12.

The double-coupling shown in Fig. 3 comprises a member 40 secured to the shaft 17 and having internal teeth 41 which mesh with external teeth 42 provided on a coupling member 43. The member 43 is disposed inside of an internal gear 44 which, in turn, is disposed inside of the intermediate gear 18. The coupling member 43 is provided with external teeth 45 which mesh with the internal gear 44. Thus, torque is transmitted from the gear 18 through the internal gear 44, the coupling members 43 and 41, the shaft 17 and the bevel gears 16 and 15, to the axle 12.

Similar coupling members 40 and 43 are provided for the shaft 17 which drives the other axle 12. A coil spring 46 may be disposed between the two coupling members 43, thereby maintaining them in spaced relation. A bearing plate 47 may be provided in the outer end of each coupling member 43 for engagement with the ends of the shafts 17. A flexible covering 48 may be provided for the space between the coupling member 40 and the internal gear 44, thereby protecting the coupling members. If desired, a roller bearing 49 may be provided in the gear case 24 for the shaft 14 in place of the sleeve bearing 25 shown in Figs. 1 and 2. Otherwise, the structure illustrated in Figs. 3 and 4 is similar to that shown in Figs. 1 and 2.

With the drive herein described, the two axles 12 are so tied together through the bevel gears 15 and 16, the shafts 17, the flexible couplings and the intermediate gear unit 18 that both axles must rotate at the same speed, as in the case of a side rod drive. However, the unbalance resulting from the use of side rods is eliminated. Furthermore, the axle drive is greatly simplified by the elimination of the quills and the cup or other flexible drives previously utilized.

As explained hereinbefore, the present drive makes it possible to utilize main truck frame members which are disposed between the wheel flanges. The foregoing features materially reduce the weight of the locomotive structure, which is of great importance in the design of a high-powered steam locomotive. Furthermore, the simplification and reduction of the number of wearing parts utilized in the driving mechanism will reduce operating and maintenance expense.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a locomotive drive, in combination, a main drive shaft, an auxiliary shaft disposed substantially parallel to the main shaft, an intermediate gear for driving the auxiliary shaft, means disposed inside of the intermediate gear for movably connecting one end of the auxiliary shaft to the intermediate gear, a pinion on the main shaft for driving the intermediate gear, an axle, a bevel gear mounted on the axle, a pinion meshing with the bevel gear, said pinion being secured to said auxiliary shaft, and a gear case mounted on the axle and enclosing said bevel gear and its pinion, said auxiliary shaft serving as a torque arm for the axle-mounted bevel gear unit.

2. In a locomotive drive, in combination, a pair of axles, a main drive shaft disposed substantially at right angles to the axles, an intermediate gear driven by the main drive shaft and disposed substantially midway between the axles, a gear mounted on each axle, an auxiliary shaft for driving each one of the axle gears, said auxiliary shafts being disposed substantially parallel to the main shaft and driven by said intermediate gear, means disposed inside of the intermediate gear for flexibly connecting the auxiliary shafts to the intermediate gear, and a gear case mounted on each axle for enclosing the gear on that axle, said auxiliary shafts serving as torque arms for the gear cases.

3. In a locomotive drive, in combination, a pair of axles, a main drive shaft disposed substantially at right angles to the axles, an intermediate gear driven by the main drive shaft and disposed substantially midway between the axles, a gear mounted on each axle, an auxiliary shaft for driving each one of the axle gears, said auxiliary shafts being disposed substantially parallel to the main shaft, means disposed inside of the intermediate gear for movably connecting the auxiliary shafts to said intermediate gear, and a gear case mounted on each axle for enclosing the gear on that axle, said auxiliary shafts serving as torque arms for the gear cases.

4. In a locomotive drive, in combination, a pair of axles, a main drive shaft disposed substantially at right angles to the axles, an intermediate gear driven by the main drive shaft and disposed substantially midway between the axles, a gear mounted on each axle, and an auxiliary shaft for driving each one of the axle gears, said auxiliary shafts being disposed substantially parallel to the main shaft, flexible coupling means disposed inside of the intermediate gear for connecting said auxiliary shafts to said intermediate gear, and a gear case mounted on each axle for enclosing the gear on that axle, said auxiliary shafts serving as torque arms for the gear cases.

5. In a locomotive drive, in combination, a pair of axles having wheels thereon, frame members disposed inside of said wheels, a main drive shaft disposed substantially at right angles to the axles, an intermediate gear driven by the main drive shaft and disposed between said frame members substantially midway between the axles, a gear mounted on each axle, an auxiliary shaft for driving each one of the axle gears, said auxiliary shafts being disposed substantially parallel to the main shaft and driven by said intermediate gear, means disposed inside of the intermediate gear for flexibly connecting the auxiliary shafts to the intermediate gear, and a gear case mounted on each axle for enclosing the gear on that axle, said auxiliary shafts serving as torque arms for the gear cases.

WINSTON A. BRECHT.